INVENTORS
Henry S. Winnicki
Leonard Seglin
AGENT

Nov. 29, 1960  L. SEGLIN ET AL  2,962,348
METHOD FOR PREPARING DENSE SODIUM CARBONATE FROM CRUDE TRONA
Filed Jan. 2, 1957  2 Sheets-Sheet 2
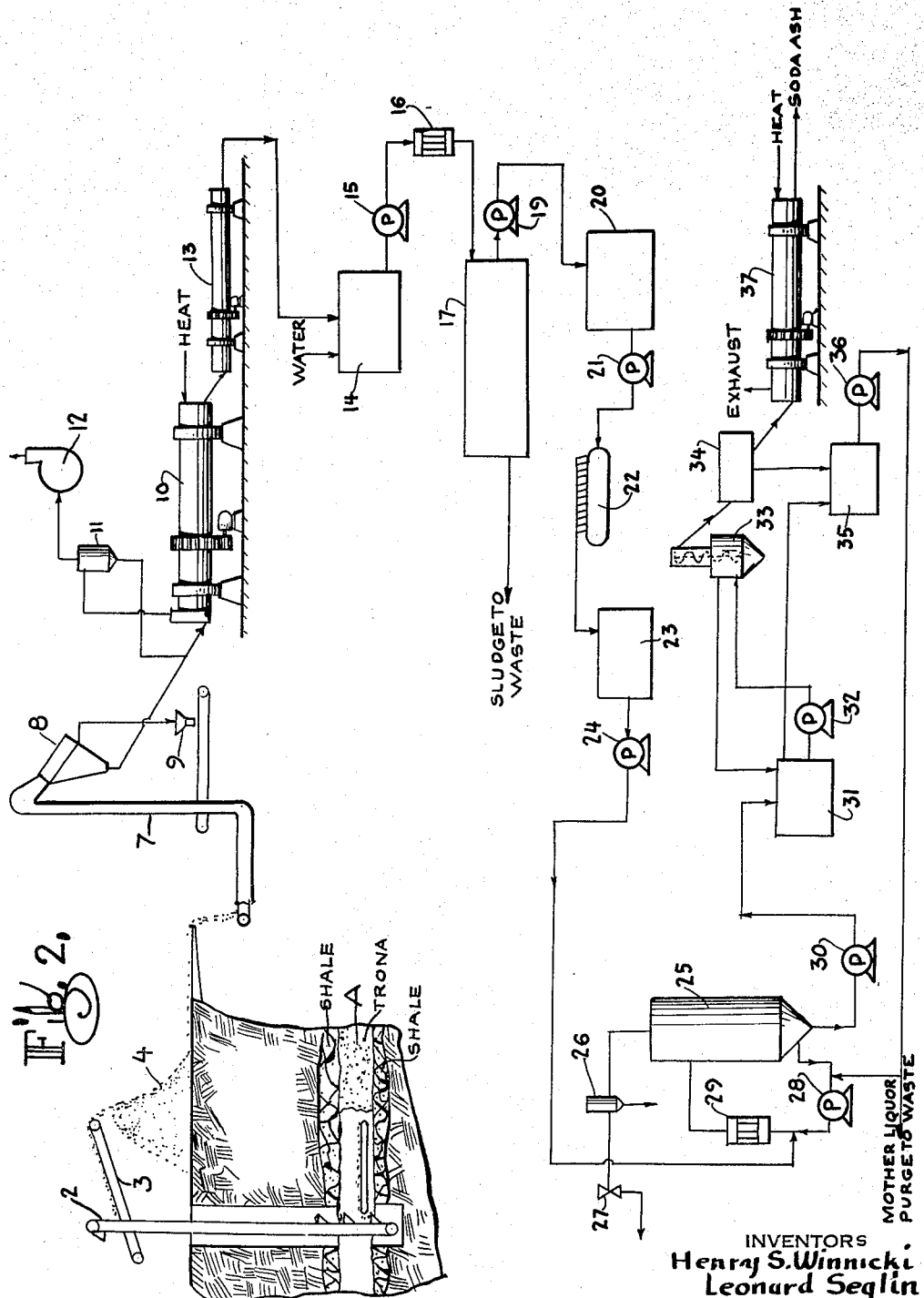
INVENTORS
Henry S. Winnicki
Leonard Seglin
BY Glenn W. Parsons
AGENT ތ
United States Patent Office 2,962,348
Patented Nov. 29, 1960

2,962,348
METHOD FOR PREPARING DENSE SODIUM CARBONATE FROM CRUDE TRONA

Leonard Seglin, White Plains, N.Y., and Henry S. Winnicki, New Canaan, Conn., assignors to Food Machinery and Chemical Corporation, New York, N.Y., a corporation of Delaware Filed Jan. 2, 1957, Ser. No. 632,236

5 Claims. (Cl. 23—31)

This invention relates to the preparation of sodium carbonate monohydrate. More particularly, this invention relates to the preparation of sodium carbonate monohydrate from crude dry-mined trona.

Located at Green River, Wyoming, is an extensive bed of crude trona. Heretofore, the crude trona by careful and costly processing has been converted into soda ash by a series of steps involving: dissolving the crude trona in a mother liquor containing excess normal carbonate over bicarbonate, treating the dissolved trona with an adsorbent, clarifying and filtering the solution, passing the filtrate to a series of vacuum crystallizers where sodium sesquicarbonate is crystallized out as the stable crystal phase, and then calcining the sesquicarbonate crystals to convert same to soda ash.

In order to obtain a soda ash having satisfactory density as well as other desirable physical properties, it has been found necessary to add to the cycling mother liquors a surface active agent. The discovery of the effect of surface active agents on the crystal properties of sesquicarbonate and subsequent soda ash is set forth in U.S. patent application Serial No. 474,828, filed December 13, 1954.

When manufacturing soda ash in this manner, the problem of organic contamination in the final soda ash must be overcome, for in many uses of soda ash the presence of organic matter is undesirable. The organic matter present in the soda ash is derived from two sources; namely, the organic matter found in the crude trona, plus the organic matter obtained from the treatment of the cycling mother liquors with the organic surface active agent. Thus, the organic problem is compounded by the addition of organic material during the processing. However, the addition of said organic matter is necessary to the preparation of soda ash having the physical characteristic of high bulk density. Therefore, we find that the producers of soda ash from crude trona by the crystallization of sesquicarbonate and calcination of sesquicarbonate to soda ash are on the horns of a dilemma. On the one hand, they are forced to add organic surface active agents to control the bulk density and other crystal characteristics of the sodium carbonate and on the other hand, they are compounding the organic removal problem by so doing.

An object of this invention is to provide a process for preparing dense, organic-free soda ash from crude trona.

A further object of this invention is to avoid the use of organic surface active agents in the production of soda ash from crude trona.

A still further object is to provide a process for the preparation of soda ash from crude trona with a shortened time cycle and increased production rate over that of prior art.

Further objects will appear to those skilled in the art as the description of this invention unfolds.

Generally stated, this invention provides a process for preparing dense, organic-free soda ash by sizing the crude trona, calcining the crude trona to convert the crude trona to crude sodium carbonate and removing the organics by oxidation and distillation, dissolving the crude sodium carbonate in water, evaporating, crystallizing from the pregnant mother liquor sodium carbonate monohydrate, calcining the monohydrate to produce dense, organic-free soda ash and recycling the mother liquor from the crystals to the evaporating step.

A typical analysis of crude trona found at Green River, Wyoming, is as follows:

TYPICAL CRUDE TRONA ANALYSIS

| Constituent | Percent |
|---|---|
| Sodium Sesquicarbonate | 92.76 |
| NaCl | .08 |
| $Na_2SO_4$ | .02 |
| $Fe_2O_3$ | 0.14 |
| Organic Matter | 0.30 |
| Insolubles | 6.7 |

As seen from the above analysis, the main constituent of crude trona is sodium sesquicarbonate.

In the process of the subject invention crude trona is processed to crude sodium carbonate by calcining and converting the sodium bicarbonate present in the crude trona to sodium carbonate. This reaction may be represented as follows:

$$2(Na_2CO_3 \cdot NaHCO_3 \cdot 2H_2O) \rightarrow 3Na_2CO_3 + 5H_2O + CO_2$$

The crude dry-mined trona may be prepared for calcination by crushing the mined trona and passing it over a screening device or other suitable separating equipment, whereby particles in the general size range of ½ to 1 inch are collected and passed to the calciner. Rejected oversize particles may then be recylced to the crushing apparatus for further crushing and screening. Proper sizing of the crude trona insures conversion of sodium bicarbonate during calcination to sodium carbonate, since oversized particles will not be converted in the calciner.

The calcination of the crude trona has a threefold effect. First, by calcining between temperatures of about 400° C.–800° C., the organic matter present in the crude trona is removed. Secondly, the calcination effects a conversion of the bicarbonate present in the crude trona to sodium carbonate. Lastly, the crude sodium carbonate resulting from the calcination has a greater rate of solubility than the crude trona. A comparison of the solubility rates is set forth in Table I.

Table I

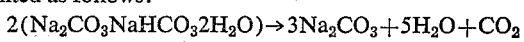

| Time, minutes | Percent $Na_2CO_3$ in Solution | |
|---|---|---|
| | Crude Trona | Crude Sodium Carbonate |
| 1 | 13 | 31.5 |
| 2 | 17 | 32.5 |
| 3 | 18.5 | 32.5 |
| 5 | 19 | 32.0 |

The increase in the rate of solubility results in a great saving in the time cycle and increased production of soda ash.

The calcination may be carried out at temperatures between about 400° C. to 800° C. While lower calcination temperatures may be employed to convert the bicarbonate values to normal carbonate, say 200° to 350° C., in order to remove the organic matter present in the crude trona, it is necessary that temperatures of about 400° C. to 800° C. be employed. 800° C. is the upper limit due to the fact that impure sodium carbonate will begin to fuse at temperatures above 800° C. A temperature between 500°–550° C. is most preferred.

A rotary, direct fired calciner may be used although other type kilns such as a vertical kiln or grate type calciner are equally suitable.

The retention time of the crude trona in the calciner is a function of the temperature of the calciner, and at a temperature of 500° to 550° C., a period of about 15 minutes has been found satisfactory.

After the crude trona is calcined it is passed to the dissolving area where water is brought into contact with the crude sodium carbonate.

The effluent from the dissolvers which is a solution of sodium carbonate, plus suspended insolubles, is then passed to a clarifier where the insolubles settle out.

If a small amount of solid matter remains suspended in the liquor after passing the carbonate solution through the clarifier, the liquors may be filtered to remove the remaining insolubles.

The liquors pregnant with sodium carbonate are then passed to the evaporating and crystallizing area.

Fig. 2 shows a diagrammatic flow sheet of the process.

Figure 1:
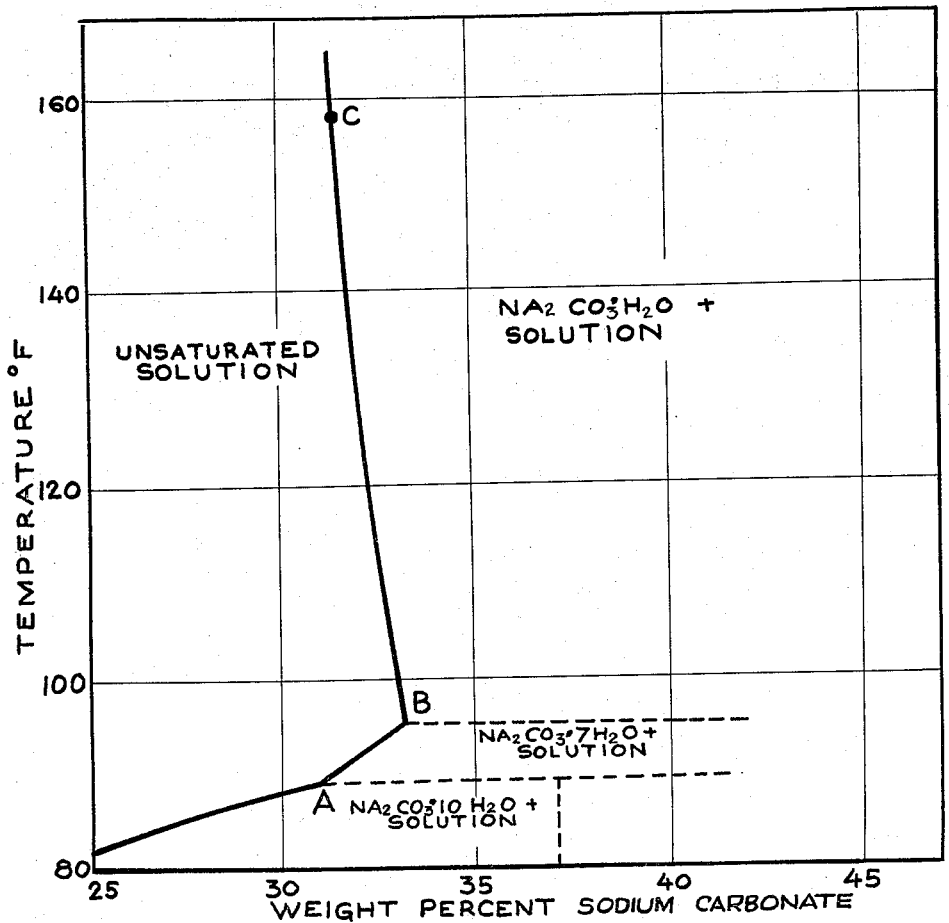
Fig. 1 shows the solubility diagram for sodium carbonate monohydrate.

As shown in Fig. 1, various hydrates can be crystallized from an aqueous solution of soda ash dependent upon the concentration and temperature of the solution.

For example, point A of Figure 1 represents the transition point between $Na_2CO_3 10H_2O$ and $Na_2CO_3 7H_2O$; point B is the transition point between $Na_2CO_3 7H_2O$ and $Na_2CO_3 H_2O$.

In order to crystallize out sodium carbonate monohydrate from an aqueous solution of sodium carbonate, it is necessary to maintain the temperature within the area above point B in Fig. 1.

It should be noted that the monohydrate line BC, shows an inverse solubility for the monohydrate, that is, the monohydrate becomes less soluble in water as the temperature is increased and thus, contrary to the usual phenomena of increased solubility with increase in temperature.

It is to be further observed that the monohydrate solubility line is quite steep, that is, a small change in concentration of solution with a relatively large change in temperature. This factor makes it necessary to resort to evaporation of the solution in order to provide a sufficient yield of monohydrate crystals.

For example, a solution saturated at 122° F. contains 32.2% $Na_2CO_3$ and at 158° F. contains 31.4% $Na_2CO_3$. In heating the saturated solution from 122° F. to 158° F., approximately 1.5 lbs. of monohydrate per 100 lbs. of original solution are crystallized. By evaporation of 20% of the original solution the yield of monohydrate increases to approximately 13 lbs. per 100 lbs. of original solution. This increase represents a nine fold increase in yield.

From the above, we see that evaporation of the carbonate liquors is the only suitable means for recovering sodium carbonate monohydrate from sodium carbonate solutions.

From the evaporating and crystallizing area the crystals of monohydrate and mother liquor are passed to a recovery area where the crystals are separated from the mother liquor and may be washed to remove any residual mother liquor.

The washed crystals are then passed to a calciner where the monohydrate is converted to dense soda ash.

Crude trona contains varying amounts of NaCl and $Na_2SO_4$, with an average analysis of about 0.3%. While the presence of NaCl or $Na_2SO_4$ depress the solubility of the monohydrate, a build up of NaCl or $Na_2SO_4$, or a combination of both, results in the formation of complex salts containing NaCl and/or $Na_2SO_4$ which may crystallize out with the monohydrate. Therefore, it is preferred to maintain the concentration of NaCl and $Na_2SO_4$ below the concentration where they will crystallize. A means of maintaining the concentration at the desired level is to purge the system by committing some of the cycling liquors to waste. It has been found convenient to operate at a concentration of about 5%, combined NaCl and $Na_2SO_4$.

Fig. 2 shows a particular embodiment of the invention. The mined trona from the trona deposit A is loaded on skip hoist 2 and lifted to a conveyor belt 3 which in turn conveys the trona to the stockpile 4. The stockpile trona is passed to a conveyor pit, where conveyor 7 elevates the trona to a screen 8. The undersize material from the screen, preferably in the one-half inch to one inch size range, are fed to the calciner 10. The oversize material from screen 8 is passed to a crusher 9 and then recycled to screen 8.

The products of combustion from the direct fired calciner 10, as well as the gaseous products of reaction, namely, water and $CO_2$, are drawn from the calciner by fan 12. A dust collector 11 can be interposed between the calciner and the fan.

The hot crude sodium carbonate discharged from the calciner 10 is cooled in the rotating cooler 13 by passing air through the unit or cooling liquid on the exterior of the shell of the cooler. The cool sodium carbonate is then passed to a dissolving tank 14 where the soda ash is dissolved in water or wash water containing a small amount of sodium carbonate dissolved therein and the insolubles remain suspended in the liquid.

The solution of soda ash and suspended solids is pumped 15 through heat exchanger 16 to provide sufficient heat to prevent crystallization and subsequent loss in the clarifier 17.

The insolubles settle out in the clarifier as the liquor passes through. Sludge forming at the bottom of the clarifier is removed by means of a rotating rake and may be further washed with water to recover any sodium carbonate therein. The relatively clear solution overflows from the clarifier 17 and is pumped by a pump 19 to a surge tank 20. At this point, if there are any suspended solids remaining in the liquid, filter aid may be added to the solution and passed through the filter 22 by pump 21.

The clear solution issuing from the filter is passed to the surge tank 23 and then by pump 24 to the evaporators 25. Before passing into the evaporators 25, the solution is first passed through heat exchanger 29 and there combines with the recirculated liquor. The hot solution enters the evaporators where the pressure is sufficiently lowered to cause boiling and removal of water by evaporation. The vapors formed are removed by a steam ejector 27. The vapors being condensed in condenser 26.

Crystals of sodium carbonate monohydrate and mother liquor are removed by pump 30 which transports the magma to settling tank 31. The crystallized magma is concentrated somewhat in the settling tank and the most concentrated magma is removed by a pump 32 and elevated to the crystallizer concentrator 33, where the crystals are further concentrated by the action of a vertical screw conveyor which removes the crystals from the mother liquor. Overflow from the crystal concentrator 33 is returned to the settling tank 31. The mother liquor adhering to the crystals from the concentrator 33 is removed in the centrifuge 34. From the centrifuge the crystals of monohydrate are passed to a dryer 37 where free water and water of crystallization are removed to form dense soda ash.

The mother liquor from the centrifuge 34 passes to the mother liquor tank 35, as does the overflow from settling tank 31. Pump 36 returns the mother liquors to the evaporator 25 to maintain a magma or crystal concentration of approximately 20% in the evaporator.

If the production of 100,000 tons/year of dense soda ash is desired, the following quantities will apply based on an 8,000 hour year:

ANALYSIS OF CRUDE CALCINED TRONA

| Constituent | Percent |
|---|---|
| $Na_2CO_3$ | 85.9 |
| $NaCl + Na_2SO_4$ | 0.4 |
| Organics | Nil |
| Insolubles | 13.7 |
| | 100.0 |

ANALYSIS OF FINISHED SODA ASH

| Constituent | Percent |
|---|---|
| $Na_2CO_3$ | 99.98 |
| $NaCl + Na_2SO_4$ | 0.02 |
| | 100.00 |
| Bulk Density, lbs./cu. ft. | 60 |

| | | |
|---|---:|---:|
| Lbs. of crude trona/hour | 42,143 | |
| Lbs. of crude soda ash/hour | 31,087 | |
| Sludge wash water effluent and centrifuge crystal wash water effluent to dissolvers, lbs. per hour: | | |
| $Na_2CO_3$ | 4,700 | |
| $NaCl + Na_2SO_4$ | 206 | |
| $H_2O$ | 69,934 | |
| | 74,840 | 74,840 |
| Dissolver effluent, lbs./hour: | | |
| $Na_2CO_3$ | 31,404 | |
| $NaCl + Na_2SO_4$ | 337 | |
| $H_2O$ | 69,934 | |
| Insolubles | 4,252 | |
| | 105,927 | 105,927 |
| Clarifier sludge to waste, lbs./hour: | | |
| $Na_2CO_3$ | 592 | |
| $NaCl + Na_2SO_4$ | 6 | |
| $H_2O$ | 11,901 | |
| Insolubles | 4,167 | |
| | 16,666 | 16,666 |
| Sludge wash water effluent, lbs./hour: | | |
| $Na_2CO_3$ | 3,274 | |
| $NaCl + Na_2SO_4$ | 36 | |
| $H_2O$ | 65,773 | |
| | 69,083 | 69,083 |
| Evaporator feed, lbs./hour: | | |
| $Na_2CO_3$ | 27,458 | |
| $NaCl + Na_2SO_4$ | 295 | |
| $H_2O$ | 61,167 | |
| | 88,920 | 88,920 |

The quantities for the evaporators are based on use of three evaporators with mother liquor recycled to the second and third evaporators. Temperatures of the magma from the evaporators are 98° C., 84° C., and 70° C., respectively.

| | | |
|---|---:|---:|
| Mother liquor recycled, lbs./hour: | | |
| $Na_2CO_3$ | 30,784 | |
| $NaCl + Na_2SO_4$ | 5,776 | |
| $H_2O$ | 78,942 | |
| | 115,502 | 115,502 |
| Mother liquor from crystal settling and centrifuging, lbs./hour: | | |
| $Na_2CO_3$ | 31,306 | |
| $NaCl + Na_2SO_4$ | 5,867 | |
| $H_2O$ | 80,108 | |
| | 117,281 | 117,281 |
| Purged mother liquor, lbs./hour: | | |
| $Na_2CO_3$ | 523 | |
| $NaCl + Na_2SO_4$ | 98 | |
| $H_2O$ | 1,167 | |
| | 1,788 | 1,788 |
| Centrifuge crystal wash water effluent, lbs./hour: | | |
| $Na_2CO_3$ | 1,428 | |
| $NaCl + Na_2SO_4$ | 177 | |
| $H_2O$ | 4,162 | |
| | 5,767 | 5,767 |
| Moist centrifuge crystals, lbs./hr. | | 31,873 |
| Soda ash produced, lbs./hour | | 25,000 |
| Water to dissolver (sludge and centrifuge washings), lbs./hr. | | 69,935 |

As indicated above, the wash water from the sludge washing and crystal washing containing about 6.2% sodium carbonate is used in the dissolvers 14 to dissolve sodium carbonate from the crude calcined trona. In this way the sodium carbonate dissolved therein is recovered. However, as indicated on the drawings, ordinary water containing no sodium carbonate dissolved therein may be used in dissolver 14.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. Process for preparing dense sodium carbonate from crude trona comprising: dry mining the crude trona, crushing the crude trona, calcining the crude trona at a temperature and for a time sufficient to convert the crude trona into crude sodium carbonate, dissolving the calcined crude sodium carbonate in water to form an aqueous solution of sodium carbonate, clarifying and filtering the aqueous solution of crude sodium carbonate to remove insolubles, heating the filtered solution of sodium carbonate, evaporating a portion of water from the sodium carbonate solution to produce sodium carbonate monohydrate crystals, separating said monohydrate crystals from the solution; recycling the mother liquor to the evaporators for further concentration and calcining said separated sodium carbonate monohydrate crystals to dense soda ash.

2. Process for preparing organic-free, dense sodium carbonate from crude trona comprising: crushing the crude trona to particles one inch and under in size, calcining crude trona at a temperature between about 500° C. to 600° C. for a time sufficient to convert the crude trona into crude sodium carbonate and to remove substantially all of the organic materials, dissolving the calcined crude sodium carbonate in water to form an aqueous solution of sodium carbonate, clarifying and filtering the aqueous solution of crude sodium carbonate to remove insolubles, heating the clarified solution of sodium carbonate, evaporating a portion of water from the sodium carbonate solution to produce sodium carbonate monohydrate crystals, separating said monohydrate crystals from the solution, recycling the mother liquor to the evaporator for further concentration, purging sufficient of said recycled mother liquor to waste to avoid buildup of impurities to a point where they will crystallize, passing said separated crystals of monohydrate to a calciner to convert said monohydrate to substantially organic-free, dense sodium carbonate.

3. Process for preparing organic-free, dense sodium carbonate from crude trona comprising: dry mining the crude trona, crushing the crude trona to particles one inch and under in size, calcining the crushed crude trona at a temperature between about 500° C. to 550° C. for approximately 15 minutes to convert the crude trona into crude sodium carbonate and to remove substantially all of the organic materials, dissolving the calcined crude sodium carbonate in water to form an aqueous solution of sodium carbonate, clarifying and filtering the aqueous solution of crude sodium carbonate to remove insolubles, heating the clarified solution of sodium carbonate to about 98° C., evaporating approximately 20% by weight of the water present from the sodium carbonate solution to produce a crystal magma at a temperature of 70° C. having about a 20% magma concentration of sodium carbonate monohydrate crystals, separating said monohydrate crystals from the solution, recycling the mother liquor to the evaporator for further concentration and to maintain said magma concentration, purging sufficient of said recycled mother liquor to waste to avoid buildup of impurities within the recycled system beyond about 5% by weight, passing said separated crystals of monohydrate to a calciner to convert said monohydrate to substantially organic-free, dense sodium carbonate.

4. Process for preparing soda ash from crude trona comprising: dry mining the crude trona, crushing the crude trona, calcining the crude trona at a temperature and for a time sufficient to convert the crude trona into crude sodium carbonate, dissolving the calcined crude sodium carbonate in water containing less than 7% $Na_2CO_3$ therein to form an aqueous solution, clarifying and filtering the aqueous solution of crude sodium carbonate to remove insolubles, heating the filtered solution of sodium carbonate to a temperature above about 95° F. and below the boiling point of the solution to crystallize sodium carbonate monohydrate crystals therefrom, separating said monohydrate crystals from the solution and calcining said separated sodium carbonate monohydrate crystals to dense soda ash.

5. Process for preparing dense sodium carbonate from crude trona comprising: dry mining the crude trona, crushing the crude trona, calcining the crude trona at a temperature and for a time sufficient to convert the crude trona into crude sodium carbonate, dissolving the calcined crude sodium carbonate in water containing less than 7% $Na_2CO_3$ therein to form an aqueous solution, clarifying and filtering the aqueous solution of crude sodium carbonate to remove insolubles, heating the filtered aqueous solution of sodium carbonate to a temperature above about 95° F. and below the boiling point of the solution, evaporating a portion of water from the sodium carbonate solution to produce sodium carbonate monohydrate crystals, separating said monohydrate crystals from the solution, recycling the mother liquor to the evaporator, discarding a portion of said recycled mother liquor to avoid buildup of impurities to a point where they will crystallize, passing said separated crystals of monohydrate to a calciner to convert said monohydrate to substantially organic-free dense sodium carbonate.

References Cited in the file of this patent
UNITED STATES PATENTS

| | | |
|---|---|---|
| 912,568 | Hess | Feb. 16, 1909 |
| 2,039,062 | Debuch | Apr. 28, 1936 |
| 2,670,269 | Rahm | Feb. 13, 1954 |
| 2,770,524 | Seaton et al. | Nov. 13, 1956 |
| 2,780,520 | Pike | Feb. 5, 1957 |